April 5, 1927.
J. COMERFORD
1,623,659
VENT CAP FOR SOIL PIPES
Filed Dec. 11, 1925
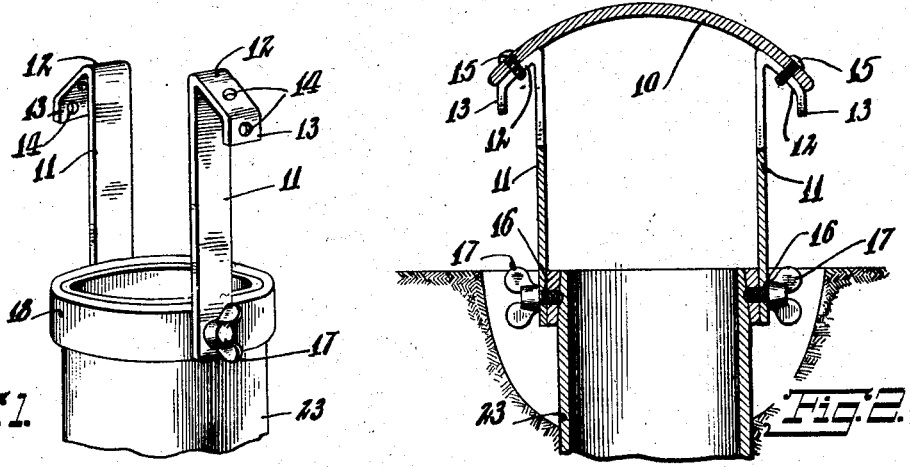
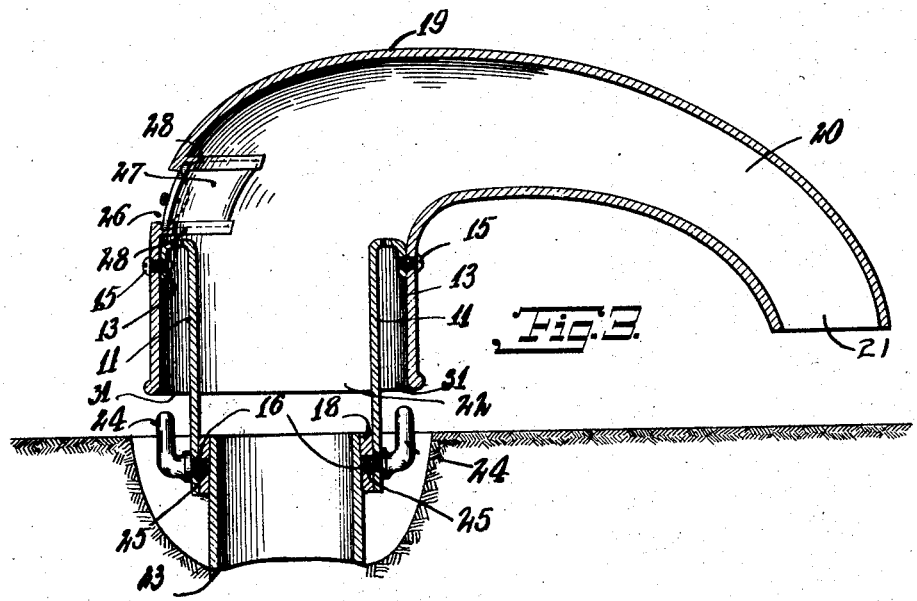
INVENTOR.
John Comerford
BY
ATTORNEY Patented Apr. 5, 1927.

1,623,659

UNITED STATES PATENT OFFICE.

JOHN COMERFORD, OF NEW YORK, N. Y., ASSIGNOR OF ONE-THIRD TO MICHAEL J. MARTLEY, OF BRONXVILLE, NEW YORK, AND ONE-THIRD TO HARRY BYRNE, OF NEW YORK, N. Y.

VENT CAP FOR SOIL PIPES.

Application filed December 11, 1925. Serial No. 74,808.

This invention relates to a new and useful device in the nature of vent-caps for soil pipes and the like, said device being particularly adapted for use in connection with buildings for the purpose of allowing a draft through the plumbing system and thereby force the foul air out.

The object of the invention is to provide a vent-cap of novel construction and arrangement of parts, adjustable to meet all requirements, hereinafter more fully described, claimed, and illustrated in the accompanying drawing, in which:—

Fig. 1 is a perspective view of the adjustable members as used in connection with my improved device.

Fig. 2 is a center sectional view of my improved device, as it would appear when in use.

Fig. 3 is a similar view showing a modification thereof.

My improved device comprises a cap 10, preferably stamped from metal of slightly convex form. The adjustable upright members 11, oppositely located, having at their upper extremities horizontal portions 12 bent or otherwise formed at right angles thereto, and also vertical portions 13 similarly formed thereto, the said horizontal portions 12 and vertical portions 13 having apertures 14 to accommodate bolts 15 or other similar detachable screws, as a means of attaching the cap; it being understood that the caps may be so constructed as to be attached to either of the apertures in the horizontal portions 12 or in the vertical portions 13. The adjustable upright members 11 are also provided with apertures 16 suitably located at or near their lower extremities to accommodate wing nuts 17 which are threaded therein and also into the ring member 18, which is attached to the upright members 11 by welding or any suitable method, as a means of holding the said adjustable upright members 11 in any desired position, the said ring member 18 being a slidable fit on the soil pipe 23, and held in any desired position by means of tightening or screwing in the wing nuts 17.

Referring in particular to Figure 3 of the accompanying drawing, in which I have shown a modified form of hoods as designated by the numeral 19, preferably of cast metal of hollow construction, elongated, and having a downwardly bent portion 20, and an opening 21 of somewhat higher relative position than the main opening 22, so as to permit of air being sucked through the opening 22 at 31 by the draft through the soil pipe 23, and exhausted at 21, which will greatly increase the efficiency of the device, the said opening 21 being of smaller diameter than the main opening 22. The hood 19 is provided with an opening 26 having a member 27 slidably attached to the hood 19, by means of slides 28 or any suitable similar means, as a means of closing the said opening 26. The hood 19 is provided with suitably located apertures to accommodate the said bolts 15, or other similar detachable screws, as a means of attaching the said hood 19 to the adjustable upright members 11 by the said apertures 14 (Fig. 1) in the vertical portions 13 of the adjustable upright members 11. In place of the heretofore mentioned wing nuts 17, I have substituted threaded members 25 having convenient handles 24, as a means of holding the adjustable upright members 11 in any desired position, as will be permitted as hereinbefore described in detail. It will be understood that the threaded members 25 are threaded into the ring member 18.

It will be understood that the heretobefore mentioned caps are interchangeable.

While I have above described the preferred form, construction and arrangement of the several elements employed, it will be understood that the device is nevertheless, susceptible of considerable modification therein, and I therefore reserve the privilege of resorting to all such changes as may be fairly embodied within the spirit and scope of the invention as claimed.

Having thus described my invention, what I claim as new, and desire to protect by Letters Patent of the United States is as follows:—

In a soil pipe the combination with a cylindrical ring member having diametrically opposite screw threaded openings therein, of detachable upright members having openings therein adapted to register with the openings of said ring, means comprising screw threaded studs adapted to be extended through the registering openings in said ring and in said upright members and to engage the sides of said soil pipe for clamping said ring thereon in an adjusted position and for securing said extensions to said ring, a thumb screw handle element on the outer end of said stud, and a detachable hood member secured to said extension at the upper end portions thereof disposed over and above the end of said soil pipe.

In testimony whereof I have affixed my signature.

JOHN COMERFORD.